United States Patent
Allinson et al.

(10) Patent No.: US 11,817,610 B2
(45) Date of Patent: Nov. 14, 2023

(54) CARBON-NEUTRAL PROCESS FOR GENERATING ELECTRICITY

(71) Applicant: The Claire Technologies Corporation, Danville, CA (US)

(72) Inventors: Paul A. Allinson, Danville, CA (US); Robert P. Hohmann, El Cerrito, CA (US); Curtis L. Munson, Oakland, CA (US); Dennis J. O'Rear, Petaluma, CA (US); Steven F. Sciamanna, Orinda, CA (US); William L. Schinski, San Rafael, CA (US); Charles R. Wilson, San Francisco, CA (US); Alan W. Klaassen, Kensington, CA (US)

(73) Assignee: The Claire Technologies Corporation, Danville, CA (US)

( * ) Notice: Subject to any disclaimer, the term of this patent is extended or adjusted under 35 U.S.C. 154(b) by 24 days.

(21) Appl. No.: 17/488,867

(22) Filed: Sep. 29, 2021

(65) Prior Publication Data
US 2022/0109175 A1 Apr. 7, 2022

Related U.S. Application Data

(60) Provisional application No. 63/088,024, filed on Oct. 6, 2020.

(51) Int. Cl.
*H01M 8/22* (2006.01)
*H01M 8/04186* (2016.01)
*H01M 8/1009* (2016.01)

(52) U.S. Cl.
CPC ......... *H01M 8/22* (2013.01); *H01M 8/04186* (2013.01); *H01M 8/1009* (2013.01)

(58) Field of Classification Search
None
See application file for complete search history.

(56) References Cited

U.S. PATENT DOCUMENTS

| 4,567,033 A | 1/1986 | Kesten |
| 6,187,465 B1 * | 2/2001 | Galloway ......... H01M 8/04097 |
| | | 429/410 |

(Continued)

FOREIGN PATENT DOCUMENTS

DE 102014006430 A1 11/2015

OTHER PUBLICATIONS

Materials Article: Hydrogen Production from the LOHC Perhydro-Dibenzyl-Toluene and Purification Using a 5 um PdAg-Membrane in a Coupled Microstructured System; Alexander Wunsch, Tatjana Berg and Peter Pfeifer.

(Continued)

*Primary Examiner* — Haroon S. Sheikh
(74) *Attorney, Agent, or Firm* — Michael Petrin; A, T & P, PC (57) ABSTRACT

The present disclosure relates generally to a carbon-neutral process for the generation of carbon-neutral hydrogen and carbon-neutral electricity. More specifically, the present disclosure relates to compositions, methods and apparatus employing a carbon-neutral process for generating electricity employing a liquid organic hydrogen carrier (LOHC) for supplying hydrogen for generating the carbon neutral electricity. The present disclosure also relates more specifically to carbon-neutral compositions consisting of liquid organic hydrogen carriers used for supplying hydrogen to generate electricity that may be regenerated in a carbon-neutral process using an apparatus with a net zero atmospheric emission of carbon oxides.

8 Claims, 4 Drawing Sheets

(56) References Cited

U.S. PATENT DOCUMENTS

| | | |
|---|---|---|
| 7,045,230 B2 | 5/2006 | Rusta-Sellehy |
| 7,261,961 B2 | 8/2007 | Kamachi et al. |
| 7,485,161 B2 | 2/2009 | Toseland et al. |
| 10,396,388 B2 | 8/2019 | Bosmann et al. |
| 10,793,000 B2 | 10/2020 | Kondo |
| 2003/0008183 A1* | 1/2003 | Hsu ...................... F17C 11/005 422/198 |
| 2010/0151292 A1 | 6/2010 | Frick et al. |
| 2011/0003218 A1 | 1/2011 | Stolte et al. |
| 2017/0130582 A1* | 5/2017 | Hsu .......................... C01B 3/38 |
| 2018/0053957 A1 | 2/2018 | Pez et al. |
| 2018/0290117 A1 | 10/2018 | Rathke et al. |
| 2019/0292048 A1 | 9/2019 | Kusche et al. |
| 2019/0309904 A1 | 10/2019 | Kusche et al. |
| 2020/0235414 A1 | 7/2020 | Teichmann et al. |

OTHER PUBLICATIONS

Energies Review: Potential Liquid-Organic Hydrogen Carrier (LOHC) Systems: A Review on Recent Progress; Purna Chandra Rao and Minyoung Yoon.

\* cited by examiner

CARBON-NEUTRAL PROCESS FOR GENERATING ELECTRICITY

PRIORITY

This application claims the benefit of the priority of U.S. patent application Ser. No. 63/088,024, entitled "Carbon-Neutral Process for Generating Electricity", filed on Oct. 6, 2020, which is hereby incorporated in its entirety by reference herein.

FIELD

This disclosure relates generally to a carbon-neutral process for generating electricity and to a liquid organic hydrogen carrier (LOHC) for supplying hydrogen for generating the carbon-neutral electricity. More specifically, this disclosure relates to carbon-neutral compositions consisting of liquid organic hydrogen carriers used for supplying hydrogen to generate electricity that may be regenerated in a carbon-neutral process using an apparatus with a net zero atmospheric emission of carbon oxides.

BACKGROUND

Fossil fuels (e.g., coal, oil, and natural gas) have been powering economies for over 150 years, and currently supply over 80 percent of the world's energy. It is well established that the combustion of fossil fuels produces undesirable emissions such as greenhouse gases.

Atmospheric greenhouse gases are harmful to the environment because they absorb infrared radiation (IR) which is subsequently released and reflected into the atmosphere, thereby increasing the mean planetary temperature over time. Rising global warming challenges due to greenhouse gas emissions necessitates a shift in the world's energy economies to alternative energy sources such as battery, solar and wind. Unfortunately, these alternative energy sources only makeup about 20 percent of the world's current total energy economy. Further, governmental regulating authorities continue to reduce the allowable greenhouse gas emissions for various fossil fuel emissions sources, including new vehicles. Society is turning towards CN (carbon-neutral) electricity as it moves away from fossil fuels in an effort to significantly reduce Green House Gas (GHG) emissions. Electric Vehicles (EVs) are beginning to make an impact in the passenger car and pickup truck market, and they are anticipated to penetrate the short and medium-haul commercial truck market. Limitations in energy density currently limit battery use in Class 7/8 long-haul tractor-trailers, trains, shipping, and aircraft. Battery banks are used to load-balance certain utility grids for short durations, typically 4 hours or less, but cannot support large back-up energy needs.

Hydrogen has been acknowledged for many years as a potential large-scale source of energy (referred to as the "hydrogen economy"). Hydrogen is a powerful fuel and produces on a mass basis three times the energy content of gasoline (120 MJ/kg vs. 44 MJ/kg). Further, combustion of hydrogen does not produce environmentally harmful IR-absorbing gas emissions.

However, numerous technical challenges are inhibiting the shift to a large-scale hydrogen economy. These challenges include, among other things, the difficulty of developing large scale long-term, safe delivery and storage infrastructures for compressed hydrogen.

Carbon-neutral systems utilizing hydrogen are known and readily available but currently available systems generally require high pressure compression in the 10,000-prig region for storage and use in fuel cells. A national high pressure hydrogen distribution infrastructure does not exist and is estimated to cost hundreds of billions of dollars to install. Systems utilizing LOHCs to transport labile hydrogen via existing fossil fuel delivery systems to remote sites, where, after dehydrogenation, they provide hydrogen to power fuel cells, are known but cannot currently operate in a carbon-neutral (CN) mode without a CN external power or heat supply.

There have been efforts to eliminate IR-absorbing gas emissions from LOHC-based hydrogen production processes using an electrical heating element to generate the heat needed to drive the dehydrogenation reaction. However, this method requires the generation and/or storage of a sufficient amount of electricity to ensure continued operations of the hydrogen production process, requiring additional electrical storage and battery management equipment. Alternatively, drawing needed electricity for the heating element from downstream equipment (e.g., a fuel cell) reduces the amount of electricity available for the target application (e.g., powering an electrical motor in a vehicle).

Others have suggested combusting produced hydrogen to generate the heat for dehydrogenation of the LOHC. However, this method lowers the amount of hydrogen available for use by downstream equipment (e.g., a hydrogen fuel cell), thereby reducing the efficiency of the overall system. Further, traditional combustion of hydrogen also introduces complexity and safety issues, particularly in portable devices.

Another alternative is adding a combustible/evaporable fossil fuel or biofuel additive to the LOHC feed. The additive is separated during the hydrogen production process and combusted to form heat for dehydrogenation of the LOHC. However, combustion of the additive produces IR-absorbing gas emissions, thereby increasing the total atmospheric concentration of these harmful gases. The additive approach thus decreases the amount of LOHC in the total feed, thereby reducing the amount of hydrogen produced as compared to a feed containing 100% LOHC.

Accordingly, there is a need for a LOHC-based process for producing hydrogen which (1) eliminates or reduces the net increase in atmospheric GHG emissions, and (2) is not solely reliant on chemical or energy products (e.g., hydrogen and electricity) needed by downstream equipment (e.g., a fuel cell, hydrogen internal combustion engine, and the like).

SUMMARY

A composition, a process and an apparatus are described and disclosed herein that provide for the generation of electricity from low pressure hydrogen with a net zero atmospheric emission of carbon oxides.

In one embodiment of the present disclosure, a blended LOHC feed composition contains a primary component consisting of an at least partially hydrogenated LOHC having a cyclic chemical structure and containing greater than 5 wt % labile hydrogen; and an added secondary component consisting of an at least partially hydrogenated LOHC having a cyclic chemical structure of CN carbon and containing greater than 5 wt % labile hydrogen. In another embodiment, the secondary component consists of carbon atoms in a cyclic framework structure that are sourced from atmospheric carbon. Exemplary processes for removing atmospheric carbon include photosynthetic processes and direct air carbon capture processes.

In one embodiment, a method is provided for generating hydrogen from a blended LOHC feed in an electricity generating power module, comprising: supplying a blended LOHC feed to an electricity generating power module, wherein the blended feed comprises a primary component and an added amount of a CN secondary component; supplying the blended LOHC feed to a dehydrogenation reactor within the power module and generating hydrogen therefrom; then electrochemically converting at least a portion of the generated hydrogen in a fuel cell unit to electricity and emitting a carbon-containing gaseous exhaust stream into the atmosphere from the power module; wherein the amount of CN secondary component that is blended into the blended LOHC feed provides sufficient CN carbon to at least match the carbon being exhausted to the atmosphere from the power module, resulting in a net zero emission of carbon oxides.

In one embodiment, the primary component feed is an at least partially hydrogenated LOHC having a cyclic chemical structure and containing greater than 5 wt % labile hydrogen. In another embodiment, the CN secondary component is an at least partially hydrogenated LOHC having a cyclic chemical structure of CN carbon and containing greater than 5 wt % labile hydrogen. In a related embodiment, the CN secondary component has essentially the same chemical composition as the primary component.

In another embodiment, an apparatus is provided for making hydrogen, the apparatus comprising a LOHC feed storage vessel containing a blended LOHC feed composition comprising a primary component consisting of an at least partially hydrogenated LOHC having a cyclic chemical structure and containing greater than 5 wt % labile hydrogen; and an added secondary component consisting of a partially hydrogenated LOHC having a cyclic chemical structure of CN carbon and containing greater than 5 wt % labile hydrogen; a dehydrogenation reactor for dehydrogenating the blended LOHC to produce gaseous hydrogen and an S-LOHC (spent or hydrogen-deficient LOHC) product; a combustion zone for combusting a portion of the S-LOHC product from the dehydrogenation zone for supplying heat to the dehydrogenation reactor; and a metering pump in fluid communication with the dehydrogenation reactor for metering an amount of the S-LOHC product from the dehydrogenation zone to the combustion zone. In one related embodiment, the metering pump is configured and controlled to supply an amount of S-LOHC to the combustion chamber such that the carbon content in the S-LOHC supplied to the combustion chamber is less than or equal to the CN carbon contained in the blended LOHC feed.

In one embodiment, a method is provided for generating carbon-neutral electrical energy using hydrogen as the energy source, comprising: supplying a recyclable LOHC to a dehydrogenation reaction zone that is maintained at dehydrogenation reaction conditions, wherein the recyclable LOHC comprises a hydrogenated recycle component, a predetermined target blend fraction of a hydrogenated carbon-neutral component, and a range from 5 to 10 wt % of carbon-neutral labile hydrogen that is available for removal by catalytic dehydrogenation; catalytically dehydrogenating the recyclable LOHC in the dehydrogenation reaction zone and recovering gaseous hydrogen and an unloaded aromatic substrate therefrom; combusting an amount of the unloaded aromatic substrate that is less than or equal to a predetermined target blend fraction to provide sufficient thermal energy to maintain the dehydrogenation reaction conditions; recovering the remaining amount of unloaded aromatic substrate; and converting at least a portion of the gaseous hydrogen generated by dehydrogenation in an electrochemical conversion device to generate the carbon-neutral electrical energy.

One embodiment of the present disclosure described herein utilizes a bi-modal energy source using low pressure LOHC technologies that enable carbon-neutral GHG operation. This is achieved by matching or exceeding the number of carbon atoms emitted at the point of use with the number of CN atoms contained in the bi-modal energy source. The amount of CN component in the energy source can be varied by end-point of use, fuel cell type and industry sector allowing unprecedented journey and regional GHG management.

The bi-modal characteristics of the blended LOHC energy source enable it, in hydrogenated form, to provide hydrogen to power fuel cells. Also, in either hydrogenated or dehydrogenated form, the energy source can be combusted or electrochemically consumed to provide heat energy for dehydrogenation of the hydrogenated form to liberate labile hydrogen, particularly in applications such as in mobile and remote applications, in which no external energy supply is available.

In one embodiment, additional bi-modal sources of LOHC in either hydrogenated or dehydrogenated form may be combusted or electrochemically consumed to provide bursts of energy when needed. This attribute is known as "Power-Boost" and CN status is maintained by adjusting the CN atom composition in the hydrogenated form. This capability is particularly valuable for short duration needs such as during aircraft take-offs and climbing, and truck/train steep-gradient ascent operations.

In effect, the disclosed embodiments of the present invention enable both fixed and mobile users to operate in a carbon-neutral mode and to also operate with low-to-zero sulfur and particulate emissions.

GLOSSARY

As used herein, the term "liquid organic hydrogen carrier" or "LOHC" refers to a hydrogenated organic substrate selected from monocyclic, homocyclic, polycyclic, mono- and poly-heterocyclic organic compounds, and combinations thereof.

LOHCs release chemically bound hydrogen via dehydrogenation and are liquid at standard temperature and pressure ("STP" being 0° C. and 1 bar of pressure).

As used herein, the term "labile hydrogen" refers to the portion of chemically bound hydrogen in a hydrogenated LOHC that may be reversibly removed by dehydrogenation, and subsequently reversibly replaced by a following hydrogenation reaction.

As used herein, the term "recyclable LOHC" or "R-LOHC" refers to a liquid organic hydrogen carrier that may be, in sequential process steps, dehydrogenated to remove at least a portion of the hydrogen atoms contained in the carrier, and rehydrogenated to replace at least a portion of the removed hydrogen atoms. Accordingly, the term "R-LOHC" also describes the hydrogen enriched or hydrogenated form of the LOHC having a surplus of labile hydrogen available.

As used herein, the term "spent LOHC" or "S-LOHC" refers to a liquid organic hydrogen carrier that has been at least partially depleted of labile hydrogen content. Accordingly, the term "S-LOHC" also refers to a fully or partially dehydrogenated form of the LOHC having a depleted level or being absent of labile hydrogen.

As used herein, the term "target blend fraction" is intended to refer to a LOHC composition containing R-LOHC and optionally, S-LOHC component, with sufficient labile hydrogen content available to perform a carbon-neutral electrical generation process for a specific operation.

As used herein, the term "green hydrogen" is intended to refer to hydrogen, either as a gaseous molecule or as source of labile hydrogen, that is produced by using clean energy from surplus renewable energy sources, such as for example, but not limited to solar or wind power, to split water into two hydrogen atoms and one oxygen atom through a process called electrolysis, and gasification of biomass and subsequent steam reforming of the bio-syngas.

A used herein, the term "blue hydrogen" is intended to refer to hydrogen, either as a gaseous molecule or as a source of labile hydrogen, that is produced from steam reforming and the byproduct carbon compounds are captured and stored underground through an industrial carbon capture and storage (CSS) process. "Blue hydrogen" is sometimes referred to as carbon-neutral (CN) as the emissions are not dispersed in the atmosphere.

As used herein, the term "PEMFC" is intended to refer to a proton-exchange membrane fuel cell. Further, as used herein, the term "HT-PEMFC" is intended to refer to PEMFC fuel cells that operate at high temperatures.

As used herein, the term "SOFC" is intended to refer to a solid oxide fuel cell.

Unless otherwise indicated, the acronym "MCH" is intended to refer to methylcyclohexane.

Unless otherwise indicated, the term "HTF" is intended to refer to a heat transfer fluid.

Unless otherwise indicated, the term "BTX" is intended to refer to a mixture of benzene, toluene, and xylene, in any ratio.

Unless otherwise indicated, the term "GHG" is intended to refer to a greenhouse gas found in the earth's atmosphere that may absorb and emit radiant energy within the thermal infrared range. $CO_2$ (carbon dioxide) is an important greenhouse gas, and a key GHG of concern in the carbon-neutral process.

Unless otherwise indicated, the term "CN" is intended to refer to "carbon-neutral" compositions, processes and apparatus employing these compositions. The process of generating hydrogen from a blended LOHC feed and of generating electricity from the generated hydrogen is termed as "carbon-neutral" by reason of the purposeful addition of the secondary component containing carbon-neutral carbon to the LOHC feed in sufficient amount to at least equal the number of carbon atoms being exhausted during the electrical generation process. The exhausted carbon atoms may include vented hydrocarbons and/or vented carbon oxides. The carbon content in the secondary component is termed as "carbon-neutral carbon" ("CNC") by reason of its origin from carbon compounds, including $CO_2$, that are captured from the atmosphere or from flue gas that would otherwise be vented to the atmosphere contributing to net positive GHG emission.

The term "wt %" as used here is equivalent to "percent by weight".

The term "bi-modal" refers to the ability of the blended LOHC to carry labile hydrogen for release in a dehydrogenation device and the ability for the CN component contained in the LOHC to be combusted without attracting carbon penalties, wherein the ratio of CN component can be adjusted to permit the operating envelope of the device in CN operation.

DETAILED DESCRIPTION OF EMBODIMENTS

Described below are an LOHC feedstock, methods and processes for generating hydrogen from the feedstock, and a power module that includes the devices for generating the hydrogen, and the associated apparatus to perform the disclosed embodiments of compositions, methods and processes hereinbelow.

Reference will be made in detail to various embodiments, examples of which are illustrated in the accompanying drawings. In the following detailed description, numerous specific details are set forth to provide a thorough understanding of the present disclosure and the embodiments described herein.

However, embodiments described herein may be practiced without these specific details. In other instances, well-known methods, procedures, components, and mechanical apparatuses have not been described in detail so as not to unnecessarily obscure aspects of the embodiments.

Where permitted, all publications, patents and patent applications cited in this application are herein incorporated by reference in their entirety; to the extent such disclosure is not inconsistent with the modified fuels described herein.

Unless otherwise specified, the recitation of a genus of elements, materials, or other components, from which an individual component or mixture of components can be selected, is intended to include all possible sub-generic combinations of the listed components and mixtures thereof. Also, "include" and its variants are intended to be non-limiting, such that recitation of items in a list is not to the exclusion of other like items that may also be useful in the materials, compositions, and methods of this process.

Reference will be made in detail to various embodiments, examples of which are illustrated in the accompanying drawings. In the following detailed description, numerous specific details are set forth to provide a thorough understanding of the present disclosure and the embodiments described herein. However, embodiments described herein may be practiced without these specific details. In other instances, well-known methods, procedures, components, and mechanical apparatuses have not been described in detail so as not to unnecessarily obscure aspects of the embodiments.

Compositions

One embodiment of the present disclosure is directed to a blended LOHC feed composition.

The liquid organic hydrogen carrier (LOHC) is a hydrogen rich carbonaceous material that is chemically stable and normally liquid at ambient conditions, having a large hydrogen capacity without the associated risks that are inherent with high-pressure hydrogen gas storage. The labile hydrogen is a chemically bound hydrogen that may be reversibly removed from the LOHC during dehydrogenation without decomposing the underlying substrate structure of the carrier. Furthermore, the LOHC provides a reliable and stable source of hydrogen without the net positive carbon emissions that are generally associated with hydrocarbon combustion to provide the thermal energy for dehydrogenation.

LOHC materials suitable for use include hydrogenated organic substrates selected from monocyclic, polycyclic, mono- and poly-heterocyclic and homocyclic organic compounds. The hydrogenated form of the LOHC releases chemically bound hydrogen via dehydrogenation to form the dehydrogenated form of the LOHC, and in a blended mixture, various amounts of dehydrogenated LOHC form or mixed components. Both the hydrogenated and dehydrogenated components are liquids at standard temperature and pressure (STP or 0° C. and 1 bar). For purposes of this disclosure, the term R-LOHC refers to the hydrogen enriched or hydrogenated form of the LOHC, and S-LOHC refers to the hydrogen depleted (i.e., dehydrogenated) form of the LOHC.

Accordingly, in one embodiment of the present disclosure, a blended LOHC composition is provided, one component thereof comprising the at least partially dehydrogenated form of the LOHC derived from a process or usage stream as disclosed herein, which can be used to regenerate a fully hydrogenated LOHC composition, including an enriched (R-LOHC) composition suitable for re-use. LOHC compositions suitable for the present invention include, but are not limited to, monocyclic pairs such as benzene/cyclohexane and toluene/methylcyclohexane, where "pairs" refer to molecules having at least one labile hydrogen form that may be readily interconverted to the other form (i.e., either hydrogenated or dehydrogenate) while leaving the molecular component intact and unchanged except for the presence or absence of the labile hydrogen(s). Exemplary homopolycyclic LOHC pairs include the decalin/naphthalene and perhydro-benzyl toluene/benzyl toluene systems. In further embodiments, exemplary heteropolycyclic LOHC pairs include the 1-methyl perhydro indole/1-methyl indole, 1,2-perhydrodimethyl indole/1,2-dimethyl indole, and perhydro dibenzyl toluene (18H-DBT)/dibenzyl toluene (OH-DBT) systems. These and other suitable pairs are disclosed in Rao et al., Energies 2020, 13(22), 6040) and Wunch et al., Materials 2020, 13(2), 277, which are both hereby incorporated herein in their entirety by reference.

As shown in reaction (I) below, the dehydrogenation of an R-LOHC, in this example embodiment being methylcyclohexane, generates an S-LOHC, e.g., toluene, and three molecules of hydrogen. The three molecules of hydrogen are termed "labile hydrogen" to indicate that they may be reversibly removed by dehydrogenation and added by hydrogenation. Toluene generated by dehydrogenation may be reversibly hydrogenated to methylcyclohexane without otherwise modifying the substituted hexagonal ring substrate structure. Accordingly, according to one embodiment of the disclosure, a suitable LOHC for use herein includes the paired toluene/MCH system, which may be termed a "recyclable LOHC".

methylcyclohexane    toluene    (I)

In one embodiment, the LOHC pair designation is represented by two chemical structures, one being fully dehydrogenated and one being fully hydrogenated. "Fully dehydrogenated" is meant to indicate that all of the labile hydrogen atoms have been removed, leaving the aromatic substrate form. In the case of the toluene/MCH system, the toluene molecule is the fully dehydrogenated species, having the aromatic substrate form. Complementing this, "fully hydrogenated" is meant to indicate that all of the sites on the molecule available for labile hydrogen attachment are occupied. In the case of the toluene/MCH pair, the MCH molecule is the fully hydrogenated species, yet exhibits the property of maintaining a pre-aromatic cyclic structure capable of dehydrogenation to produce the complementary molecular pair. Other suitable examples of LOHC pairs include the benzene/cyclohexane system and the decalin/naphthalene system. In further embodiments, the R-LOHC representation for the hydrogenated form includes partially hydrogenated forms as well as the fully hydrogenated form, e.g., partially hydrogenated with only one or two labile hydrogens available Likewise, the S-LOHC representation for the dehydrogenated form includes partially dehydrogenated forms. It will be understood, therefore, in reference to a particular composition or process using the compositions of the present disclosure, that the S-LOHC form will contain relatively fewer labile hydrogen atoms than the R-LOHC form in any inventive process or composition. In one embodiment, the R-LOHC form contains greater than 5 wt % labile hydrogen that may be chemically removed by dehydrogenation The resultant S-LOHC form may contain less than 5 wt % labile hydrogen.

Likewise, in related embodiments, the LOHC, either in its R-LOHC or S-LOHC form, will range in the extent of "purity" of up to 100%, the purity being the relative amount of available or labile hydrogen extractable from the LOHC materials using the methods, processes and apparatus of the present disclosure. In practice, the LOHC may comprise at least about 80 wt % of a single LOHC species, or at least about 90 wt % of the single LOHC species, or in a range from 90-99.9 wt % of the LOHC species, or in a range from 95 to 99 wt % of the LOHC species.

Primary LOHC Component

In further embodiments, the blended LOHC feed composition contains a primary component consisting of an at least partially hydrogenated LOHC having a first cyclic chemical structure and an added secondary component consisting of an at least partially hydrogenated LOHC having a second cyclic chemical structure that is sourced from or originating from a source of CN carbon. The primary component may contain greater than 5 wt % labile hydrogen. Likewise, the secondary component may contain greater than 5 wt % labile hydrogen.

At least a portion of the primary LOHC co may be synthesized from conventional petroleum sources, including, for example but not limited to catalytic hydrogenation of S-LOHC from a petroleum source. The labile hydrogen contained in the LOHC feed blend may be added by catalytic hydrogenation of S-LOHC, using "green" or "blue" hydrogen as the reactant hydrogen. Green or blue hydrogen are generated by processes that balance carbon emissions with carbon removal or that eliminates carbon emissions altogether. Using green or blue hydrogen ensures that the electrochemical conversion of hydrogen in the process does not contribute to GHG emissions to the atmosphere, at least with regard to the hydrogen component. At least a portion of the primary component of the LOHC feed blend may be derived as S-LOHC that is recovered as liquid phase recycle from a dehydrogenation reaction, as described in various embodiments herein, and catalytically hydrogenated to form the R-LOHC. One or both of a petroleum based component and recycle S-LOHC based component may be present in the primary component, in a percentage from 100% petroleum-based to 100% recycle based component, or at any intermediate ratio or component percentage. It will be generally desirable, for reasons of resource and energy utilization and environmental impact, to maximize the amount of recycle based component in the R-LOHC feed, with a petroleum component added as needed to make up for any shortfall in recycle component availability. The LOHC feed blend may contain more than 5% recycle, and in some situations in a range from 10% to 95% recycle.

In one embodiment of the present disclosure, a blendable liquid organic hydrogen carrier (LOHC) composition comprises (a) a primary component consisting of at least one partially hydrogenated liquid organic compound having a cyclic chemical structure; wherein a liquid organic compound is a molecule that is interconvertible between a fully hydrogenated form and at least one of a partially or fully dehydrogenated form without significant decomposition; and wherein the primary component contains greater than 5 wt % labile hydrogen.

In another embodiment, the blendable LOHC further includes a second LOHC composition comprising a secondary component consisting of a partially hydrogenated second liquid organic compound having a cyclic chemical structure; wherein the second liquid organic compound is a molecule that is interconvertible between a fulling hydrogenated form and at least one of a partially or fully dehydrogenated form without significant decomposition; wherein the secondary component contains at least 5 wt % labile hydrogen; and wherein the secondary component is present at a level of between 0.1-25 wt % of the blendable liquid hydrogen carrier.

In yet another embodiment, the blendable LOHC contains one or more liquid organic compounds selected from a monocyclic molecule, a homocyclic molecule, a polycyclic molecule, a mono-heterocyclic molecule and a poly-heterocyclic molecule, and combinations thereof.

In a further embodiment, the blendable LOHC contains one or more liquid organic compound selected from benzene, toluene, xylene, xylol, dimethylbenzene, trimethylbenzene, naphthalene, benzyl-toluene, 1-methyl perhydro indole, 1,2-perhydrodimethyl indole, perhydro dibenzyl toluene, and all partially hydrogenated isomers thereof, and combinations thereof.

In a further embodiment, the blendable LOHC contains one or more liquid organic compound that is at least one partially or fully hydrogenated and is selected from cyclohexane, methyl cyclohexane, dimethyl cyclohexane, trimethyl cyclohexane, benzyl-methyl cyclohexane, decalin, 1-methyl indole, 1,2-dimethyl indole, dibenzyl toluene, and all partially dehydrogenated isomers thereof, and combinations thereof.

In one embodiment, the blendable LOHC contains a primary component that is substantially hydrogenated to contain greater than 80 wt % of a single organic compound, or alternatively at least about greater than 90 wt % of a single organic compound, or alternatively greater than 99 wt % of a single organic compound, or yet alternatively greater than 99.9 wt % of a single organic compound. Further, the primary component may contain a hydrogenated form of recycled LOHC derived from a dehydrogenation process according to one or more embodiments of the present disclosure.

In another embodiment, the blendable LOHC contains a secondary component that comprises carbon that is sourced from a carbon-neutral source selected from atmospheric capture of carbon compounds, photosynthesis, biomass feedstock, chemical direct air carbon capture, and combinations thereof.

Green or Blue Hydrogen

The R-LOHC feed contains an amount of chemically bound hydrogen that is available for removal by catalytic dehydrogenation. In one embodiment of the present disclosure, the chemically bound and liable hydrogen is from a renewable resource, generated by one or more renewable processes. Renewable hydrogen may be classified as green or blue hydrogen. Green hydrogen may be produced or sourced for example, but not limited to electrolysis of water using renewable energy or thermochemically derived from a biological source. Blue hydrogen may be produced, for example, by hydrocarbon oxidation with carbon capture and storage (CCS), or by partial oxidation or thermal pyrolysis of biomass, or by hydrocarbon pyrolysis with solid carbon capture. In one embodiment, the secondary LOHC component is a cyclic hydrocarbon having a chemical structure similar to that of the primary component and with structural carbon atoms of a differing isotopic signature that are derived from renewable precursors, and may contain greater than 5 wt % labile hydrogen. By reason of the origin of the carbon atoms present in the secondary LOHC component, the secondary LOHC component is carbon-neutral with respect to carbon emissions. In effect, carbon atoms that are exhausted in the process and in the operation of the power module according to embodiments of the present disclosure are at least matched by the carbon atoms present in the secondary LOHC component that is contained in the LOHC blend feed. The amount of secondary LOHC component in the blended LOHC feed may be determined using, for example ASTM D6866-21 Method B, entitled "*Standard Test Methods for Determining the Biobased Content of Solid, Liquid, and Gaseous Samples Using Radiocarbon Analysis*". Also suitable for use herein are methods that enable the determination of naturally derived carbon content based on carbon-14 measurement and ratios of carbon-12 to carbon-14.

In one embodiment, the secondary LOHC is produced from a plant or animal biomass. Biomass from plant or animal sources can be purposely grown energy crops, wood or forest residues, waste from food crops, horticultural waste, or food processing residues. Production of LOHCs from biomass generally involves one or more biomass conversion steps, such as pyrolysis, gasification, anaerobic digestion, or fermentation. Typical reaction products from these processing methods include one or more of methanol, ethanol, methane, acetic acid, lactic acid, and syngas. One or more of these biomass conversion products may be used to generate an aromatic precursor of the carbon-neutral carrier. An exemplary, but non-limiting process for converting ethanol to BTX involves use of a Zr-modified ZSM-5 (Zeolite Socony Mobil-5 framework type) aluminosilicate zeolite catalyst. In effect, the carbon contained in the secondary LOHC derived from biomass has been removed from the atmosphere as atmospheric $CO_2$, that is converted through one or more chemical processing steps to the secondary LOHC component. The secondary component of the LOHC feed as disclosed in embodiments herein is therefore carbon-neutral with respect to the carbon contained therein, and to any processing step involving the secondary component.

In one embodiment, the secondary LOHC is synthesized through one or more steps from $CO_2$ that is removed from the atmosphere by direct air carbon capture. Carbon dioxide separation from flue gas is well known in the art. In another embodiment, the secondary LOHC is synthesized through one or more steps from precursor molecules, in a process that includes solid carbon capture or $CO_2$ sequestration.

LOHC Blends

In one embodiment of the present disclosure, the components of the LOHC feed blend may be produced in a manufacturing facility that prepares at least one of the blend components. When the LOHC feed is blended in large quantities, the ratio of secondary to primary components in the blend may be based on, for example, regional, fleet and/or class averages of carbon emissions. A fleet average LOHC feed blend ratio may be based on, for example, an average value for a particular type of vehicle. A regional average may be based on a particular region of the country supplied by the manufacturing facility. A class average may involve supplying multiple LOHC fuel blends, each tailored for a particular class of use (e.g., automobiles, trucks, ships, tugs, forklifts, buses, stationary units, particular types of fuel cells, etc.). Tailored LOHC feed blends may be prepared for mobile and stationary units and in related embodiments alternative LOHC feed blends may be prepared and distributed for different types of fuel cells being employed, for example, dependent on whether the fuel cell is a PEMFC or an SOFC type.

In another embodiment, a facility for delivering an LOHC feed blend may be equipped with on-site storage vessels for separately storing primary and secondary components for the feed blend. The feed blend delivered to a particular unit may be tailored for that unit. The blend ratio may be uniquely determined for each unit and for the particular use for the fuel blend that is being delivered. Conditions influencing the amount of secondary component to blend with the primary component to maintain overall CN operation include the operating characteristics of the vehicle, vehicle class and weight; on-board fuel cell type and size; and characteristics of the vehicle journey during which the supplied fuel blend is being used, including atmospheric pressure, vehicle velocity, elevation changes, wind, and other weather factors impacting vehicular fuel efficiency and usage.

Non-limiting representative ranges for different power module applications include the following. For a power module employing conventional PEMFC or SOFC fuel cells in steady state operation, the amount of secondary component supplied in the fuel blend may be in a range from 0.5-10 wt % secondary component, based on the total fuel blend. For power modules having a stand-alone combustion chamber for combusting S-LOHC, the fuel blend may be in a range from 1 to 10 wt % secondary component, based on the total fuel blend. For power modules supplying electricity for energy intensive applications, e.g., trucks in heavy-haul, long-distance service, the fuel blend may contain a range from 0.5-20% secondary component in order to have sufficient CN component to compensate for added power requirements, particularly for acceleration, for negotiating changing elevations, and for handling windy conditions. For ferries, tugs, ships, and other heavy-duty maritime vessels, the fuel blend may contain a range from 0.5-20% secondary component. For aircraft, the fuel blend may be in a range from 10-25 wt % secondary component.

In one embodiment, the power module is equipped with multiple tanks for storing the primary and secondary components separately on-board or adjacent to the power module. In related embodiments, the power module may be equipped with metering and monitoring devices on one or more of the exhaust ports through which carbon is passed from the power module to the atmosphere. As the primary fuel is supplied for dehydrogenation, a monitoring device responsive to the amount of carbon being emitted into the atmosphere controls a metering device which supplies sufficient secondary component for blending into the primary feed stream prior to dehydrogenation Adding secondary component to the feed to at least match the carbon being emitted into the atmosphere helps to ensure CN operation of the power module. Further embodiments of the present disclosure contemplate use of the secondary LOHC component supplied from carbon-neutral sources.

Further embodiments of the present disclosure contemplate use of the secondary LOHC component supplied from carbon-neutral sources. From 1 to 10 wt % of the CN component may be used to provide dehydrogenation power by combustion in a furnace, gas turbine or other means in both PEMFC and SOFC applications. Additional range extending volume up to 20 wt % or 25 wt % CN material may provide additional power by driving an electric generator in PEMFC configurations or may be directly injected into the anode chamber of an SOFC causing additional electricity to be generated in an SOFC which will have been oversized to allow this mode of operation.

Power Module

In one embodiment of the present disclosure, the power module supplies the electrical energy used by mobile or stationary devices. Storage vessels may be included in the power module for containing one or more dehydrogenation feeds, and at least one spent liquid dehydrogenation product (i.e., S-LOHC). In one embodiment, a first storage vessel is supplied for storing an R-LOHC dehydrogenation feed blend, and a second storage vessel is supplied for storing a S-LOHC liquid dehydrogenation product. In another embodiment, a first storage vessel is supplied for storing a quantity of primary LOHC component, a second storage vessel is supplied for storing a S-LOHC liquid dehydrogenation product, and a third storage vessel is supplied for storing a quantity of secondary LOHC component. The primary LOHC component and the secondary LOHC component that are storage within on-board storage vessels may be combined in an R-LOHC feed blend prior to dehydrogenation. Any plurality of on-board storage vessels may be combined into a single vessel containing multiple volumes, the volumes being separated by one or more flexible bladders.

In another embodiment, the power module includes one or more storage vessels for an R-LOHC feed blend and for S-LOHC dehydrogenation liquid products; a dehydrogenation reaction zone for generating hydrogen from the R-LOHC feed blend; a hydrogen purification device configured and controlled to prepare the hydrogen for electrochemical conversion and electricity generation; and an electrochemical conversion device for generating electricity. In some embodiments, the power module may include a combustion zone in fluid communication with the dehydrogenation reaction zone. The combustion zone may be provided for combusting a portion of the spent dehydrogenation liquid product to produce thermal energy for maintaining the dehydrogenation reaction zone at reaction conditions.

Dehydrogenation

In one embodiment, the dehydrogenation reaction process converts at least a portion of the R-LOHC feed blend to gaseous hydrogen and a liquid S-LOHC product. This process results in at least 80 wt %, or alternatively at least 90 wt %, or yet alternatively at least 95 wt % of the labile hydrogen contained in the R-LOHC feed blend being recovered as gaseous hydrogen following the catalytic dehydrogenation process as disclosed herein.

In related embodiments of the disclosure, the dehydrogenation reaction zone may be a fixed bed, multi-tube reactor, with at least one or a plurality of reaction tubes filled with particulate dehydrogenation catalyst contained within a reactor shell. The reaction tubes may be configured for sequential or serial flow. The reaction tubes may be heated by contact with heated combustion exhaust gases or may be submerged in a heated liquid phase heat transfer fluid ("HTF") for temperature control. In one embodiment, the heated HTF may be heated by contact with combustion gases from the combustion chamber. Alternatively, the heated HTF may be at least partially heated by heat exchange with the fuel cell elements in the fuel cell unit. The catalyst containing tubes may also be heated by electrical energy. The reactor tubes may be configured for parallel flow, with each reactor tube configured to receive a portion of the reaction zone feed. Bundles of parallel flow reactor tubes may further be configured as staged reactor bundles, each stage after the first receiving partially converted products from the preceding stage of reactor tubes with respect to reactant flow, and subsequently passing additionally converted products to any subsequent stage. The reactor tubes may be configured in a U-tube shape for facilitating feed and product preheating and handling.

In further embodiments, the R-LOHC feed blend may be supplied to the reaction zone as a single preheated, vapor phase stream, or as multiple streams, each of which may be supplied at the same, or in some cases differing, temperatures. Alternatively, the dehydrogenation reaction zone may be a single catalyst containing vessel through which the LOHC feed blend is passed for conversion to hydrogen and an unloaded aromatic substrate depleted in labile hydrogen, as one non-limiting example of an S-LOHC generating process step.

Dehydrogenation reaction conditions suitable for use in the present disclosure include an average catalyst temperature in the range of 250° C. to 600° C., or alternatively in a range of 350° C. to 600° C., or yet alternatively in a range of 300° C. to 400° C., and a total pressure in the range of 1 to 5 Barg (BAR gauge). Thermal energy needed to maintain the reaction zone temperature and to overcome the endothermic requirements of the dehydrogenation reaction is generated within the power module. In various embodiments, the sources of thermal energy suitable for use include heat from one or more of an on-board combustion chamber(s), thermal energy generated during operation of the electrochemical conversion device, or electrical energy.

In related embodiments, heat may be supplied for the dehydrogenation reaction via one or more of a R-LOHC feed blend preheating step, R-LOHC feed blend vaporization step, or from heat passed directly to the dehydrogenation reaction zone. The R-LOHC feed blend may be preheated via heat exchange prior to the reaction step to a temperature in the range of 250° C. and 400° C. Preheated hydrogen may also be added to the feed blend prior to or within the reactor to reduce the amount of coking at the reactor inlet. Alternatively, the feed blend may be preheated to a temperature above the dehydrogenation reaction temperature to compensate for the normal cooling effect of the endothermic reaction in the reaction zone, while minimizing coke formation at the initially higher temperature in the reaction zone. In this regard, an inlet temperature of up to 600° C. may be employed in some embodiments.

The dehydrogenation catalysts suitable for use herein generally comprise an active metal on an oxide support. Suitable active metals include, for example but are not limited to, nickel, platinum, palladium, rhodium, iridium and ruthenium. The oxide support may be highly porous gamma alumina, silica, magnesia, or silica-alumina support having a surface area of greater than 150 $m^2/g$. In one embodiment, the catalyst is a particulate solid, comprising particulates in the form of irregular shaped particulates, powder particulates, cylindrical particulates, or spherical particulates, and having average diameters ranging from 0.1 mm to 5 mm. In another embodiment, reactor tubes through which the reacting fluid flows are coated on the inside surface of the tubes with a coating of a catalytic material to improve overall efficiency.

The normally liquid S-LOHC product (i.e., liquid phase at ambient temperature and pressure) obtained from a dehydrogenation step may include partially or fully dehydrogenated aromatic substrates of the LOHC. In one embodiment of an R-LOHC feed blend containing MCH as the primary component, the S-LOHC dehydrogenation product may contain a toluene-enriched unloaded aromatic substrate as well as unreacted MCH, condensation compounds of MCH and reaction fragments from destructive decomposition of MCH. The S-LOHC dehydrogenation liquid product may contain at least 60 wt % toluene, or alternatively at least 80 wt % toluene; or yet alternatively at least 95 wt % toluene, the remainder being non-toluene dehydrogenation reaction byproducts, such as MCH, partially dehydrogenated MCH, mixed xylenes, and multi-ring aromatics, and combinations thereof.

In one embodiment, the S-LOHC reaction product may be separated into two portions: a recycle liquid is passed to on-board storage for eventual removal from the module; and a combustion liquid is passed to a combustion chamber for generating the thermal energy used in the power module. The fraction of the S-LOHC that is recovered as combustion liquid is metered to the combustion chamber such that the carbon contained in the combustion liquid is less than or equal to the CN carbon contained in the R-LOHC feed blend, thus maintaining carbon-neutral operation of the power module.

In another embodiment, the recycle liquid is withdrawn from the module for recycle and reuse as R-LOHC feed.

Purifying Hydrogen

Producing purified hydrogen for electrochemical conversion generally involves separating a gaseous hydrogen phase from the normally liquid components of the dehydrogenated product, using one or a combination of liquid condensation, membrane separation, or filtration. One or more stages of separation may be used. In at least one of the stages, a refrigeration cycle may be included to facilitate separation of the remaining normally liquid components from the gaseous hydrogen product. In various embodiments, the hydrogen may be cooled to a sub-ambient temperature of 0° C. or alternatively lower to −10° C. or alternatively lower to −20° C. or yet alternatively lower to −25° C. or below. Chlorofluorocarbons that may be useful as refrigerants are well known in the art.

In addition to cooling, various embodiments of the present disclosure contemplate that membrane separation or carbon filtration may be used in either the first cooling stage, the second cooling stage, or in both. The stages of purification are configured to produce a purified hydrogen stream with a purity of at least 99 wt %, or alternatively in other embodiments, at least 99.96 wt %.

Combustion Chamber

In one embodiment of the present disclosure, a combustion chamber may be provided for supplying heat to the power module. Exemplary combustion chambers include, but are not limited to, a forced air furnace, a micro gas turbine, and a reciprocating engine, and the like capable of generating heat. Heat from the combustion chamber may be supplied as heated combustion exhaust gases that are passed directly to the dehydrogenation reaction zone at dehydrogenation conditions and/or for preheating and/or vaporizing the dehydrogenation feed. Supplying heat for reaction may include using the exhaust combustion gases to heat a circulating heat transfer fluid for conveying heat for reaction zone feed preheat and/or for reaction zone temperature control.

Fuel Cell

In one embodiment of the present disclosure, the power module contains a fuel cell electrochemical device for converting on-board generated hydrogen to electrical power. The fuel cell device generates electricity by conversion of chemical energy of the hydrogen fuel and air into electricity through a pair of redox reactions. Example suitable fuel cells suitable for use in the vehicle include, but are not limited to, an alkaline fuel cell (AFC), a Proton-Exchange Membrane Fuel Cell (PEMFC), a phosphoric acid fuel cell (PAFC), a molten carbonate fuel cell (MCFC), an oxide ceramic or solid oxide fuel cell (SOFC) and the like, being capable of converting a hydrogen source into electricity. Fuel cells most suitable for use in the present disclosure may be operated with atmospheric oxygen from the environment as an oxidizer gas, with the result that no storage of the oxidizer gas is required. In further embodiments, the fuel cell device may comprise one or more individual fuel cell units.

In another embodiment, the electrochemical conversion device for converting carbon-neutral hydrogen to electrical power may include a solid oxide fuel cell (SOFC) device operating in a temperature range of approximately 400-650° C. Without being bound by theory, approximately 30-35% of the energy generated in the SOFC is thermal energy that is suitable for at least partially maintaining the dehydrogenation reaction zone temperature at a desired temperature. In further embodiments, gases exhausted from the anode side of the SOFC system include unreacted hydrogen and a small amount of S-LOHC, such as toluene, that was carried with hydrogen feed to the SOFC from the dehydrogenation zone. Gases exhausted from the cathode side of the SOFC system, including oxygen depleted air and water vapor, are combined with the anode exhaust stream in a catalytic conversion unit, which produces water, oxygen depleted air and $CO_2$ from aromatic liquid oxidation. In one embodiment, an R-LOHC feed blend for use with the SOFC device may contain in a range of between 0.1-10 wt % of a secondary R-LOHC component in order to maintain the overall carbon-neutral process, or alternatively a range of between 0.1-6 wt % of a secondary R-LOHC.

In one embodiment, the electrochemical conversion device for converting carbon-neutral hydrogen to electrical power may include a Proton-Exchange Membrane Fuel Cells (PEMFC) operating in a temperature range of between 50-100° C. Only a small portion, if any, of the heat generated by a PEMFC may be available for use with the dehydrogenation reaction zone. The remaining heat for dehydrogenation when employing a PEMFC fuel cell device is provided by combustion of a portion of the combustion liquid. In a closely related embodiment, a higher operating temperature fuel cell, or HT-PEMFC may be employed, operating in a temperature range of between 120 and 200° C. In these embodiments, an R-LOHC feed blend for use with the PEMFC or HT-PEMFC unit may contain a range of 0.1-25 wt %, or, alternatively 0.5-15 wt %, or, alternatively 1-10 wt % of a secondary R-LOHC feed component in order to maintain the overall carbon-neutral process.

Methods

One embodiment of the present disclosure includes a method for generating carbon-neutral electrical energy using hydrogen as the energy source, comprising the steps of: (a) supplying a recyclable LOHC to a dehydrogenation reaction zone that is maintained at dehydrogenation reaction conditions, the recyclable LOHC comprising a hydrogenated recycle component, a predetermined target blend fraction of a hydrogenated carbon-neutral component, and within a range from 5-10 wt % carbon-neutral labile hydrogen that is available for removal by catalytic dehydrogenation; (b) catalytically dehydrogenating the recyclable LOHC in the dehydrogenation reaction zone and recovering gaseous hydrogen and an unloaded aromatic substrate therefrom; (c) combusting an amount of the unloaded aromatic substrate that is less than or equal to the predetermined target blend fraction to provide sufficient thermal energy to maintain the dehydrogenation reaction conditions; (d) recovering the remaining amount of unloaded aromatic substrate; and (b) converting at least a portion of the gaseous hydrogen generated by dehydrogenation in an electrochemical conversion device to generate the carbon-neutral electrical energy.

An additional embodiment of the present disclosure includes a method further including the additional steps of: (a) forming an unloaded hydrogen carrier comprising a recycle component and the predetermined target blend fraction, based on the weight of the unloaded hydrogen carrier, of a carbon-neutral component; and then (b) adding carbon-neutral hydrogen to the unloaded hydrogen carrier by catalytic hydrogenation to form the recyclable LOHC comprising the hydrogenated recycle component and the hydrogenated carbon-neutral component; wherein the unloaded hydrogen carrier being characterized by a labile hydrogen content of at least 5 wt %.

Yet an additional embodiment of the present disclosure includes a method further including the additional steps of: (a) adding carbon-neutral hydrogen by catalytic hydrogenation to a recycle component to form the hydrogenated recycle component; (b) adding carbon-neutral hydrogen by catalytic hydrogenation to a carbon-neutral component to form the hydrogenated carbon-neutral component; and then (c) blending the hydrogenated recycle component with the predetermined target blend fraction, based on the weight of the recyclable LOHC, of the hydrogenated carbon-neutral component, to form the recyclable LOHC.

One embodiment of the present disclosure includes a method further including the additional step of recycling at least a portion of the remaining amount of unloaded aromatic substrate as the recycle component to the recyclable LOHC; wherein at least a portion of the recycle component is recovered from a hydrogen-to-electricity generation process; and wherein at least 10 wt % of the recycle component is recovered from a hydrogen-to-electricity generation process.

One additional embodiment of the present disclosure includes a method wherein the recycle component recovered from a hydrogen-to-electricity generation process comprises at least 50 weight % toluene.

An additional embodiment of the present disclosure includes a method wherein the hydrogenated carbon-neutral component is prepared from at least one carbon-neutral precursor, including but not limited to ethanol produced by fermentation of biomass, the ethanol being catalytically cyclized to form the carbon-neutral component.

A related embodiment of the present disclosure includes a method wherein the carbon-neutral precursor is methanol produced from biomass, municipal solid waste, biogas, or recovered $CO_2$ from the atmosphere.

An additional embodiment of the present disclosure includes a method wherein the carbon-neutral component comprises at least 90 wt % carbon-neutral toluene.

One embodiment of the present disclosure includes a method wherein the carbon-neutral hydrogen is green hydrogen, generated by electrolysis of water using electrical energy that was generated from wind, solar, hydroelectric, or geothermal energy; or alternatively is blue hydrogen produced by hydrocarbon oxidation with carbon capture and storage (CCS), or by partial oxidation or thermal pyrolysis of biomass, or by hydrocarbon pyrolysis with solid carbon capture.

One embodiment of the present disclosure includes a method wherein the recyclable LOHC comprises at least 90 wt % MCH.

Another embodiment of the present disclosure includes a method wherein the target blend fraction is in a range of 0.1-25 wt %.

Yet another embodiment of the present disclosure includes a method wherein the unloaded hydrogen carrier comprises at least 20 wt % of the recycle component.

A further embodiment of the present disclosure includes a method wherein the unloaded hydrogen carrier comprises at least 90 wt % toluene.

One embodiment of the present disclosure includes a method wherein the unloaded aromatic substrate recovered from the dehydrogenation reaction zone for recycle as the recycle component comprises toluene and dehydrogenation byproduct contaminants.

Another embodiment of the present disclosure includes a method wherein the recycle component comprises at least about 70 wt % toluene and less than about 30 wt % dehydrogenation byproduct contaminants selected from one or more of MCH, partially dehydrogenated MCH, xylene, and multi-ring aromatics.

One embodiment of the present disclosure includes a method including the additional step of removing at least a portion of the dehydrogenation byproduct contaminants from the recycle component prior to or during the catalytic hydrogenation step.

A further embodiment of the present disclosure includes a method wherein the recyclable LOHC contains sufficient hydrogenated carbon-neutral component to convert at least 80 weight % of the labile hydrogen contained in the recyclable LOHC to gaseous hydrogen during catalytic dehydrogenation of the recyclable LOHC.

Yet another embodiment of the present disclosure includes a method wherein the dehydrogenation reaction conditions include a dehydrogenation temperature in a range of 350° C. to 600° C.

One additional embodiment of the present disclosure includes a method with an additional step wherein gaseous hydrogen and the unloaded liquid substrate are generated in the dehydrogenation process, and wherein from 0.1-25 wt % of the unloaded liquid substrate is available for combustion to maintain the dehydrogenation process at carbon-neutral operating conditions.

Another embodiment of the present disclosure includes a method with the additional steps of: (a) combusting up to the target blend fraction of the unloaded liquid substrate in air to generate thermal energy for vaporizing; (b) heating the recyclable LOHC to a determined dehydrogenation temperature; and then (c) for maintaining the dehydrogenation temperature of the dehydrogenation reaction zone.

One embodiment of the present disclosure includes a method with the additional step of purifying the gaseous hydrogen recovered from the dehydrogenation reaction zone; wherein this step is performed prior to a step of converting at least a portion of the gaseous hydrogen in the electrochemical conversion device.

Another embodiment of the present disclosure includes a method with the additional steps of: (a) collecting gaseous hydrogen recovered from the dehydrogenation reaction zone; (b) chilling the gaseous hydrogen by refrigeration to obtained chilled hydrogen gas; and then (c) passing the chilled hydrogen gas to a PEM electrochemical conversion device.

One further embodiment of the present disclosure includes a method wherein the gaseous hydrogen is cooled by refrigeration to −10° C. or lower to liquefy contaminants remaining in the gaseous hydrogen and to obtain gaseous hydrogen having a purity of at least 99.9 wt %.

A further related embodiment of the present disclosure includes a method with the additional step of further purifying a gaseous hydrogen by means of using a membrane capable of separating gaseous hydrogen from vapor phase hydrocarbons, such as but not limited to toluene.

One embodiment of the present disclosure includes a method employing an electrochemical conversion device, wherein the electrochemical conversion device is a PEMFC and the target blend fraction is in a range from 1-10 wt %.

A further embodiment of the present disclosure includes a method employing an electrochemical conversion device, wherein the electrochemical conversion device is a SOFC and the target blend fraction is in a range from 0.5-5 wt %.

One embodiment of the present disclosure includes methods for generating hydrogen from a blended liquid organic hydrogen carrier (LOHC) feed in an electricity generating power module, comprising the steps of: (a) supplying a blended LOHC feed to an electricity generating power module; wherein the blended feed comprises a primary component and an added amount of a secondary component; wherein the secondary component comprises carbon that is sourced from a carbon-neutral source; (b) supplying the blended LOHC feed to a dehydrogenation reactor within the power module; (c) generating hydrogen therefrom; (d) electrochemically converting at least a portion of the generated hydrogen in a fuel cell unit to electricity; and (e) emitting a carbon-containing gaseous exhaust stream into the atmosphere from the power module; wherein the amount of secondary component that is blended into the blended LOHC feed provides a corresponding amount of carbon-neutral sourced carbon to at least match the amount of carbon being exhausted to the atmosphere from the power module.

Another embodiment of the present disclosure includes methods for generating hydrogen from a blended liquid organic hydrogen carrier (LOHC) feed in an electricity generating power module wherein the primary component of a blended LOHC feed is an at least partially hydrogenated primary liquid organic compound having a cyclic chemical structure and containing greater than 5 wt % labile hydrogen; wherein, optionally, the primary component is stored in a first storage vessel in the power module.

A related embodiment of the present disclosure includes methods for generating hydrogen from a blended liquid organic hydrogen carrier (LOHC) feed in an electricity generating power module wherein the secondary component of a blended LOHC feed is an at least partially hydrogenated secondary liquid organic compound having a cyclic chemical structure and containing greater than 5 wt % labile hydrogen; wherein the secondary component comprises carbon that is sourced from a carbon-neutral source; and wherein, optionally, the secondary component is stored in a second storage vessel in the power module.

Another embodiment of the present disclosure includes methods for generating hydrogen from a blended liquid organic hydrogen carrier (LOHC) feed in an electricity generating power module wherein the blended LOHC feed contains between 0.1-25 wt % of a secondary component.

Yet another embodiment of the present disclosure includes methods for generating hydrogen from a blended liquid organic hydrogen carrier (LOHC) feed in an electricity generating power module wherein the blended LOHC consists of a primary component feed originating from a first storage vessel and a predetermined amount of a secondary component feed originating from a second storage vessel; wherein at least one fuel cell unit electrochemically converts at least a portion of the generated hydrogen to electricity while emitting a carbon-containing gaseous exhaust stream into the atmosphere from the power module; wherein the amount of added secondary component present in the blended LOHC provides sufficient carbon content to at least match the predetermined amount of carbon to be exhausted to the atmosphere from the operating power module.

One additional embodiment of the present disclosure includes methods for generating hydrogen from a blended liquid organic hydrogen carrier (LOHC) feed in an electricity generating power module wherein the blended LOHC consists of a primary component feed with a metered amount of a secondary LOHC component; and wherein the blended LOHC feed originates from a first storage vessel; further comprising the steps of: (a) determining the amount of carbon content of the carbon-containing gaseous exhaust stream emitted from a fuel cell; and (b) adding a metered amount of a secondary component feed into a primary component feed; wherein the metered amount of the secondary component provides sufficient carbon to at least match the determined amount of carbon being emitted in the gaseous exhaust stream during the conversion of the blended LOHC feed to electricity.

Another embodiment of the present disclosure includes methods for generating hydrogen from a blended liquid organic hydrogen carrier (LOHC) feed in an electricity generating power module wherein the blended LOHC feed is selected from a monocyclic molecule, a homocyclic molecule, a polycyclic molecule and a heterocyclic molecule, and combinations thereof.

Further related embodiments of the present disclosure includes methods for generating hydrogen from a blended liquid organic hydrogen carrier (LOHC) feed in an electricity generating power module wherein a blended LOHC feed contains at least one liquid organic compound selected from cyclohexane, methyl cyclohexane, dimethyl cyclohexane, trimethyl cyclohexane, benzyl-methyl cyclohexane, decalin, 1-methyl indole, 1,2-dimethyl indole, dibenzyl toluene, and all partially dehydrogenated isomers thereof, and combinations thereof; and wherein the blended LOHC feed contains at least 5 wt % labile hydrogen.

Specific non-limiting embodiments of the process are illustrated by the appended figures and the following descriptions.

Figure 1:
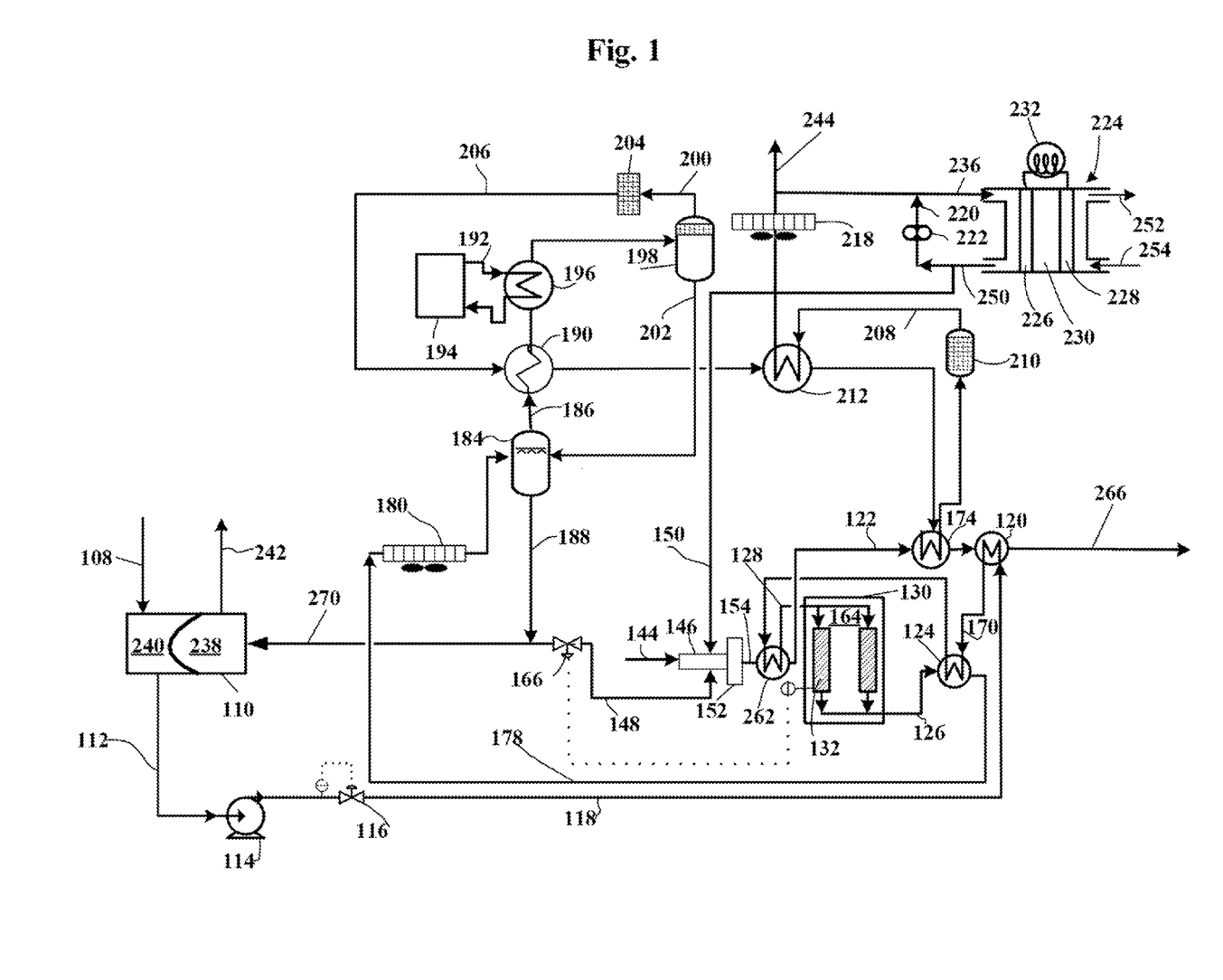
FIG. 1 illustrates a schematic of one embodiment of the disclosed process for generating carbon-neutral electricity from a recyclable LOHC feed using a PEMFC electrochemical conversion cell.

According to the embodiment illustrated in FIG. 1, fresh LOHC containing 6.5 wt % hydrogenated carbon-neutral component is supplied from an external source 108 to storage vessel 110. Fresh LOHC feed 112, containing from 0.1-10 wt % of a secondary LOHC feed component, from fresh feed portion 240 of storage container 110 is pressurized through pump 114 to approximately 3.0 Barg (gauge pressure in bars) and the flow rate controlled by control valve 116. The pressurized feed 118 is preheated in heat exchange unit 120 to approximately 160° C. by exchange with combustion exhaust gas 122, then in heat exchange unit 124 to a temperature of approximately 340° C. by heat exchange with the reactor effluent stream 126 and finally to 475° C. by heat exchange unit 262 with exhaust gases 154 from combustion chamber 152. Preheated reactor feed 128 then passes into dehydrogenation reaction zone 130, the reaction zone comprising a multiplicity of reactor tubes 132 containing hydrogenation catalyst. In this particular embodiment, the LOHC illustrated employs the toluene/methylcyclohexane pair system as the process composition.

The dehydrogenation of MCH to toluene and hydrogen is endothermic and requires external heat. Air 144 supplied to a combustion chamber mixing box 146 is combined with an unloaded aromatic substrate comprising toluene 148 and waste hydrogen 150 recovered from the electrochemical conversion device 224; combustion occurs in the combustion chamber 152 and the combustion gases 154 are supplied to preheat the reactor feed 262 and then to the shell side 164 of reaction zone 130 for maintaining the temperature in the catalyst containing reactor tubes 132 at the dehydrogenation reaction temperature. Up to 6.5 wt % of the unloaded aromatic substrate is burned to provide dehydrogenation energy, equal to or less than the weight percentage of hydrogenated carbon-neutral component in the LOHC feed, thus maintaining the process as a carbon-neutral process.

In this embodiment, cooled reactor effluent 178 leaving heat exchange unit 124 is further cooled to approximately 50° C. in fin-fan heat exchange unit 180; from there it enters a first separation unit 184 where the gaseous hydrogen 186 is separated from the liquid toluene 188. Alternative embodiments include heat exchange units selected from an air-cooler, radiator, and the like, capable of either removing heat or transferring heat efficiently. Hydrogen 186 leaving the first separation unit 184 overhead zone at approximately 90 wt % purity is cooled in heat exchange unit 190 to approximately 5° C. and further chilled by refrigerant 192 (generated in refrigeration unit 194) in heat exchange unit 196 to approximately −25° C. prior to entering the second separation unit 198 where further separation of hydrogen 200 (from the overhead zone) and toluene 202 occurs. Toluene 202 from the base of second separation unit 198 is returned to the first separation unit 184. The hydrogen stream 200 exiting the second separation unit 198 is charcoal filtered to approximately 99.96 wt % purity in charcoal filer 204. Purified hydrogen stream 206 then cools hydrogen stream 186 in heat exchange unit 190 and is then heated by hydrogenation reactor effluent 208 to approximately 190° C. in heat exchange unit 212 and combustion exhaust gas 122 in heat exchange unit 174 to approximately 200° C. before entering hydrogenation reactor 210 where trace amounts (approximately 400 ppm) of toluene are converted to inert MCH. Cooled combustion exhaust gas is vented at 266.

Hydrogenation reactor effluent 208 is cooled to 50° C. in feed/effluent heat exchange unit 212 and in fin-fan heat exchanger 218 and joins the anode gas hydrogen recycle stream 220 downstream of anode circulating compressor 222. A bleed stream 244 may be removed to maintain hydrogen purity. For related embodiments using SOFC compositions, the hydrogenation reactor 210 and feed/effluent exchanger 212 may be eliminated. Approximately 4 wt % of the circulating anode gas stream is pulse-vented via conduit 150 to combustion chamber mixing box 146 to prevent inert build-up (primarily cathode side back-diffusion products) from impacting fuel cell performance.

In related embodiments, the electrochemical conversion device 224 may be a PEMFC or SOFC. Purified hydrogen is supplied to anode side 226 through stream 236. Air 254 is supplied to the cathode side 228 to react with hydrogen, with ions exchanged between the anode side 226 and cathode side 228 through electrolyte layer 230. Electrons are routed via external wiring 232 to generate power. The anode exhaust stream 250 comprises unreacted hydrogen. Cathode exhaust stream 252 may comprise nitrogen and water vapor which is generated in the cathode reaction.

Liquid toluene 188 from the base of the first separation zone 184 is routed to the spent fuel portion 238 of on-board storage vessel 110 in stream 270, for removal via 242 from the process as needed, being for recycle and rehydrogenation using green/blue hydrogen to convert into fresh or recycled MCH for reuse.

Up to 6.5 wt % of the liquid toluene from a first separation zone 184 is supplied as combustion toluene 148 in the combustion zone 152, thus ensuring that the process illustrated in FIG. 1 is carbon-neutral, operating with net-zero carbon emissions.

Figure 2:
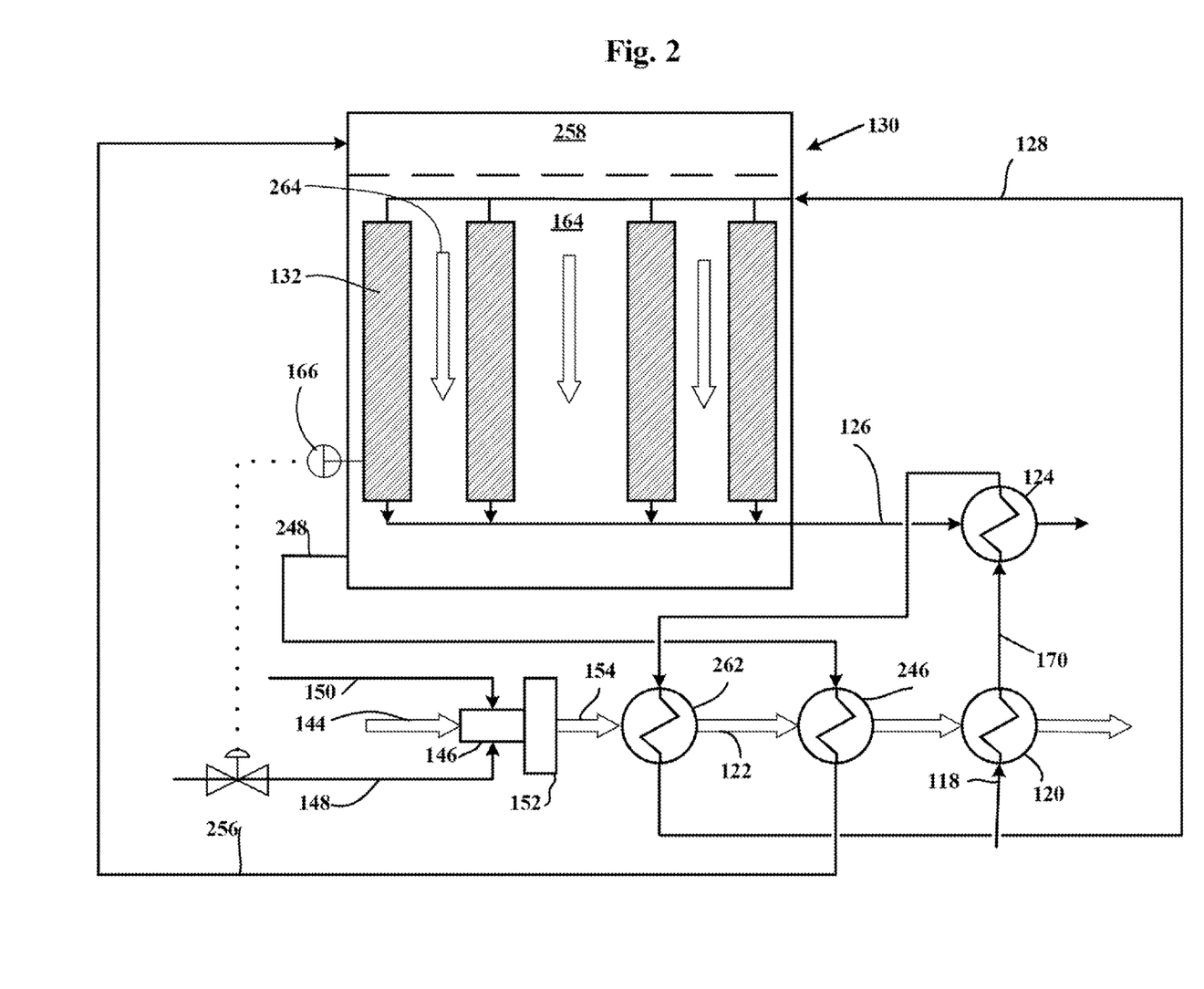
FIG. 2 illustrates a schematic of one embodiment of the disclosed process for supplying heat to a dehydrogenation reaction zone to generate hydrogen for conversion in a PEMFC.

FIG. 2 illustrates an embodiment of the dehydrogenation reaction zone 130 wherein the thermal energy from the combustion chamber is conveyed to the dehydrogenation reaction zone. The particular configuration embodied in FIG. 2 is particularly suited for use with an electrochemical conversion unit such as a PEMFC. As noted, the dehydrogenation of MCH to toluene and hydrogen is endothermic and requires external heat. Air 144 supplied to a combustion chamber mixing box 146 is combined with an unloaded aromatic substrate 148 comprising toluene, and may comprise at least 75 wt % toluene, and waste hydrogen 150 recovered from an electrochemical conversion unit; combustion occurs in the combustion chamber 152 and the combustion gases 154 pass through heat exchange unit 262, preheating the reactor feed to approximately 475° C., then through heat exchange unit 246, for heating the heat transfer fluid 256 that is circulated to supply heat recovered from combustion to the reaction zone 130. Hot heat transfer fluid 256 may be passed to the reaction zone as a liquid phase fluid, a vapor phase fluid, or as a mixed liquid/vapor phase. An exemplary, but non-limiting heat transfer fluid suitable for use is Therminol 72 Heat Transfer Fluid from the Eastman Chemical Company, Kingsport, Tenn., USA.

In this embodiment, the shell side 164 of the dehydrogenation reaction zone 130 is flooded with the heat transfer fluid 264 to supply heat to the catalyst containing reaction tubes 132 within the reaction zone. The reaction zone 130 may contain one or a plurality of reaction tubes 132, and in related embodiments, these can be arranged in a serial or parallel configuration, the latter shown in the present embodiment illustrated in FIG. 2. Heat transfer may be enhanced by the condensation of vapor phase heat transfer fluid in operations which include supplying mixed phase heat transfer fluid to the reactor. Heat transfer fluid 248 exiting the reaction zone may be circulated at approximately 360° C. through heat exchange unit 246 where the temperature is raised to approximately 395° C. by heated combustion gases from combustion chamber 152. Hot HTF 256 is passed to the distribution region 258 of the shell side 164 of the reaction zone 130, providing reaction heat. The reactor core temperature in the catalyst containing reactor tubes 132 is controlled at approximately 360° C. by temperature controller 166 which adjusts the flow of unloaded aromatic substrate 148 burned in the combustion chamber 152. In a further embodiment, a high temperature over-ride (not shown) prevents the heating fluid from exceeding 400° C. Preheated reactor feed 128 enters the reaction zone 130 and reaction products exit the reactor at 126 at a temperature of approximately 350° C. Reaction products are cooled in heat exchange unit 124 with incoming heated feed 170.

Fresh LOHC feed 118 is preheated by combustion exhaust gases 122 in heat exchange unit 120 and are further heated to reaction temperature in feed/effluent heat exchanger 124.

Figure 3:
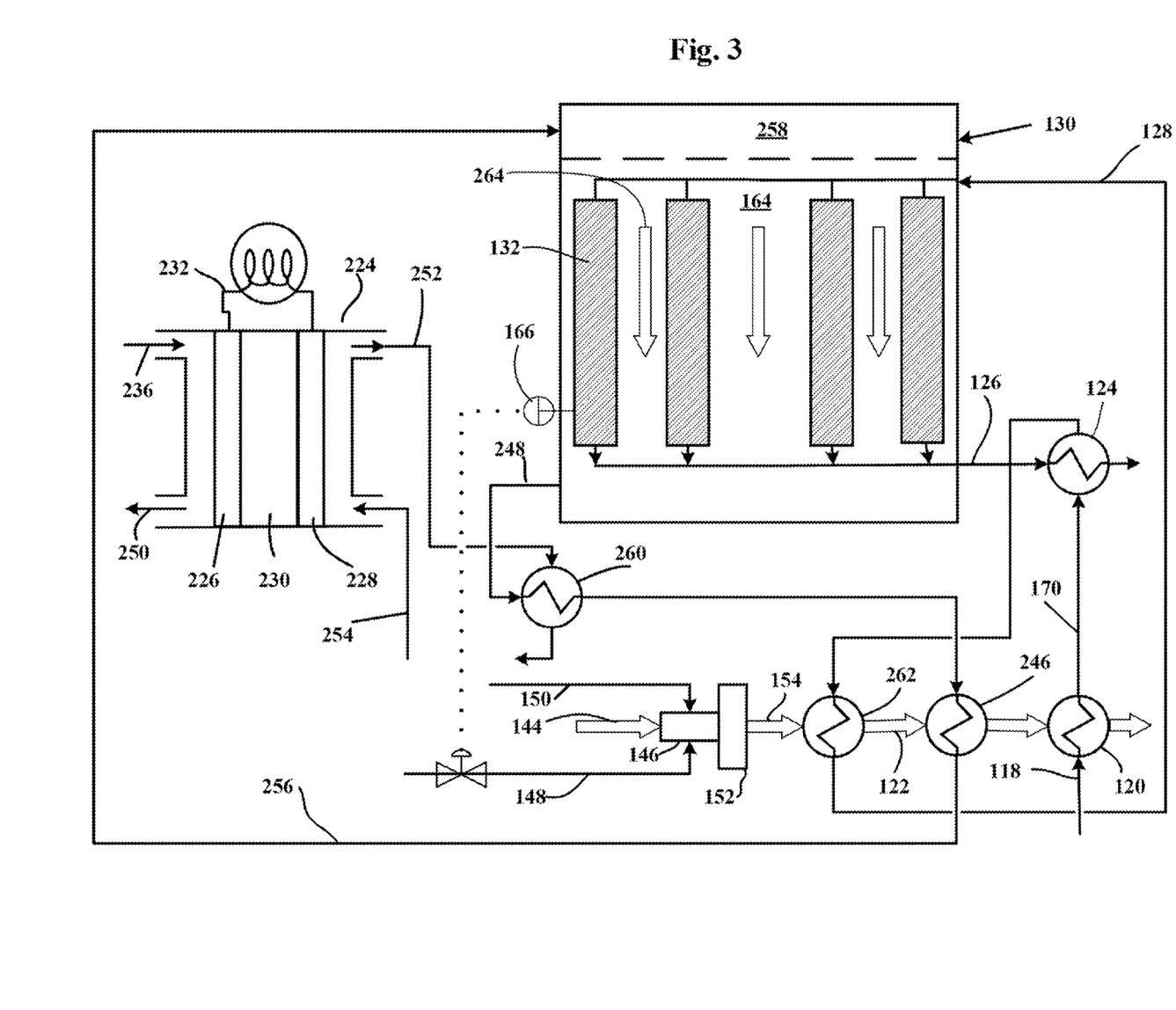
FIG. 3 illustrates a schematic of one embodiment of the disclosed process for supplying heat to a dehydrogenation reaction zone to generate hydrogen for conversion in a SOFC.

FIG. 3 illustrates an embodiment of the dehydrogenation reaction zone 130 wherein the thermal energy from the combustion chamber is conveyed to the dehydrogenation reaction zone. The particular configuration represented in FIG. 3 is suited for use with an electrochemical conversion unit such as a SOFC. As noted, the dehydrogenation of MCH to toluene and hydrogen is endothermic and requires external heat.

In this embodiment, at least a portion of the heat for maintaining the dehydrogenation reaction temperature is supplied from the electrochemical conversion device 224. Hydrogen 236 is fed to the anode side 226 of the conversion device, where it reacts with oxygen ions from supplied oxygen gas or ambient air which pass from the cathode 228 to the anode 226 via the electrolyte layer 230, while electrons are routed via external wiring 232 to generate power. The anode exhaust stream 250 comprises unreacted hydrogen. In one embodiment, air 254 is supplied to the cathode side 228 of the conversion device 224. The cathode exhaust stream 252 comprising nitrogen and water vapor carries away the excess heat generated by the conversion device and is used to preheat the heat transfer fluid 248 in heat exchange unit 260.

In this embodiment, air 144 supplied to a combustion chamber mixing box 146 is combined with an unloaded aromatic substrate 148 comprising toluene, or alternatively a stream comprising at least 75 wt % toluene, and waste hydrogen 150 recovered from an electrochemical conversion unit. Subsequently, combustion occurs in the combustion chamber 152 and the combustion gases 154 pass through heat exchange unit 262 for preheating the reactor feed to approximately 475° C., then through heat exchanger 246 for heating the heat transfer fluid 256 that is circulated to supply heat recovered from combustion to the reaction zone 130. Hot heat transfer fluid 256 may be passed to the reaction zone as a liquid phase fluid, a vapor phase fluid, or as a mixed liquid/vapor phase, depending on the instant temperature, pressure, flow rates and associated equipment parameters at the time.

The shell side 164 of the dehydrogenation reaction zone 130 is flooded with the HTF 264 to supply heat to the catalyst containing reaction tubes 132 within the reaction zone. In related embodiments, heat transfer may be enhanced by the condensation of vapor phase heat transfer fluid in operations which include supplying mixed phase heat transfer fluid to the reactor. Heat transfer fluid 248 exiting the reaction zone may be circulated at approximately 360° C. through preheater 260 followed by heat exchange unit 246 where the temperature is raised to approximately 395° C. by heated combustion gases from combustion chamber 152. In some embodiments for operating conditions in which the cathode exhaust stream 252 contains enough heat energy to meet the heat requirements for dehydrogenation reactor operation and dehydrogenation reaction feed preheat in exchanger 120, the amount of unloaded aromatic substrate 148 supplied for combustion may be reduced or eliminated entirely.

Hot HTF 256 is passed to the distribution region 258 of the shell side 164 of the reaction zone 130, providing reaction heat. In this embodiment, the reactor core temperature in the catalyst containing reactor tubes 132 is controlled at approximately 360° C. by temperature controller 166 which adjusts the flow of unloaded aromatic substrate 148 burned in the combustion chamber 152. A high temperature over-ride prevents the heating fluid from exceeding approximately 400° C. Preheated reactor feed 128 enters the reaction zone 130 and reaction products exit the reactor at 126 at a temperature of approximately 350° C. Reaction products are cooled in heat exchange unit 124 with incoming heated feed 170.

Fresh LOHC feed 118 is preheated by combustion exhaust gases 122 in heat exchange unit 120 and are further heated to reaction temperature in feed/effluent heat exchanger 124.

Figure 4:
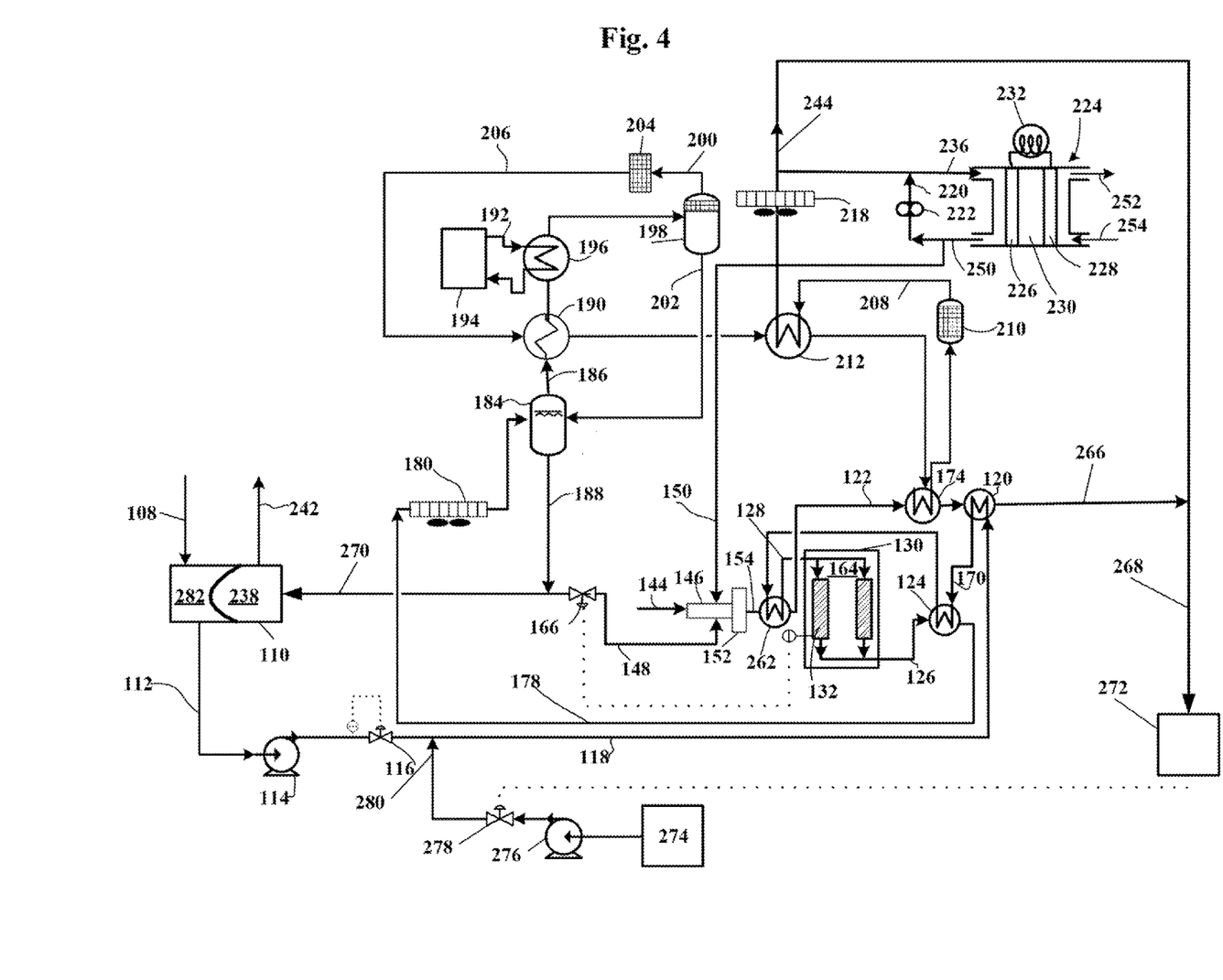
FIG. 4 illustrates a schematic of one embodiment of the disclosed process for the carbon-neutral regeneration of a recyclable LOHC from spent LOHC.

A further embodiment of the present disclosure is illustrated in FIG. 4. Corresponding elements in FIG. 4 that appear in FIGS. 1-3 are described above. In the embodiment illustrated in FIG. 4, fresh feed storage vessel 110 contains a fresh LOHC feed 282 having some amount of a secondary carbon-neutral (CN) feed component. A secondary CN feed component 280 is metered from secondary feed component storage vessel 274 by pump 276 into the feed line 112. The flow rate of secondary CN feed component 280 is controlled by control valve 278 which is in electronic communication with carbon detector 272 for determining the quantity of carbon being vented from the process. In further embodiments, example vent streams include bleed stream 244 and combustion exhaust gas 266 that are combined in stream 268 prior to analysis by carbon detector 272. In the process embodiment in FIG. 4, the delivery rate of carbon derived from carbon-neutral sources that is contained in the secondary feed component 280 is matched with the carbon detected in the combined exhaust stream 268, in order to maintain an overall carbon-neutral process.

Additional embodiments of the present disclosure relating to the methods and processes described hereinabove are now presented in more general terms to describe the steps and components of an apparatus capable of performing the disclosed methods.

One embodiment includes a method for generating hydrogen from a blended liquid organic hydrogen carrier (LOHC) feed in an electricity generating power module, consisting of the steps of (a) supplying a blended LOHC feed to an electricity generating power module, the blended feed comprising a primary component and an added amount of a secondary component; wherein the secondary component comprises carbon that is sourced from a carbon-neutral source; (b) supplying the blended LOHC feed to a dehydrogenation reactor within the power module, and generating hydrogen therefrom; (c) electrochemically converting at least a portion of the generated hydrogen in a fuel cell unit to electricity and emitting a carbon-containing gaseous exhaust stream into the atmosphere from the power module; wherein the amount of secondary component that is blended into the blended LOHC feed provides a corresponding amount of carbon-neutral sourced carbon to at least match the amount of carbon being exhausted to the atmosphere from the power module.

Another embodiment contemplates a method wherein the primary component of a blended LOHC feed is an at least partially hydrogenated primary liquid organic compound having a cyclic chemical structure and containing greater than 5 wt % labile hydrogen; wherein, optionally, the primary component is stored in a first storage vessel in the power module.

A further embodiment contemplates a method wherein the secondary component of a blended LOHC feed is an at least partially hydrogenated secondary liquid organic compound having a cyclic chemical structure and containing greater than 5 wt % labile hydrogen; wherein a secondary component comprises carbon that is sourced from a carbon-neutral source, wherein, optionally, the secondary component is stored in a second storage vessel in the power module.

Yet another embodiment contemplates a method wherein a blended LOHC feed contains between 0.1-25 wt % of a secondary component.

One additional embodiment includes use of a blended LOHC that consists of a primary component feed originating from the first storage vessel and a predetermined amount of a secondary component feed originating from the second storage vessel; wherein the fuel cell unit electrochemically converts at least a portion of the generated hydrogen to electricity while emitting a carbon-containing gaseous exhaust stream into the atmosphere from the power module; wherein the amount of added secondary component present in the blended LOHC provides sufficient carbon to at least match the predetermined amount of carbon to be exhausted to the atmosphere from the operating power module.

A related embodiment includes use of a blended LOHC that consists of a primary component feed with a metered amount of the secondary LOHC component; wherein the blended LOHC feed originates from the first storage vessel; further comprising the steps of: (a) determining the amount of carbon content of the carbon-containing gaseous exhaust stream emitted from the fuel cell; and (b) adding a metered amount of a secondary component feed into a primary component feed; wherein the metered amount of a secondary component provides sufficient carbon to at least match the determined amount of carbon being emitted in the gaseous exhaust stream during the conversion of the blended LOHC feed to electricity.

In these embodiments, the blended LOHC feed may be selected from a monocyclic molecule, a homocyclic molecule, a polycyclic molecule, a mono- or poly-heterocyclic molecule, and combinations thereof.

Suitable molecules for use include liquid organic compounds selected from cyclohexane, decalin, dibenzyl toluene, and all partially hydrogenated isomers thereof.

A apparatus for performing the methods and processes of the present disclosure may be configured in multiple manners, using functionally equivalent components, devices, equipment, pumps, controls and the like that operate to enable the methods and processes of the present disclosure.

One general embodiment contemplates an apparatus for generating hydrogen from a blended liquid organic hydrogen carrier (LOHC) feed consisting of a (a) LOHC feed storage vessel for containing a blended LOHC feed composition that is composed of a primary component consisting of an at least partially hydrogenated LOHC having a cyclic chemical structure and containing greater than 5 wt % labile hydrogen; and an added secondary component consisting of a partially hydrogenated LOHC having a cyclic chemical structure sourced from a carbon-neutral carbon source and containing greater than 5 wt % labile hydrogen; (b) a power module having at least one or a plurality of (c) a dehydrogenation reactor for dehydrogenating the blended LOHC to produce gaseous hydrogen and a secondary LOHC composition; (d) a combustion zone for combusting a portion of the secondary LOHC composition from the dehydrogenation reactor and for supplying heat to the dehydrogenation reactor; and (e) a metering pump in fluid communication with the dehydrogenation reactor for metering an amount of the secondary LOHC product from the dehydrogenation reactor to the combustion zone.

Another embodiment includes an apparatus according to the present disclosure further including a metering pump configured and controlled to supply an amount of secondary LOHC to the combustion chamber, such that the carbon content in the secondary LOHC supplied to the combustion chamber is less than or equal to the amount carbon-neutral carbon content present in the blended LOHC feed, enabling net CN operation.

In a related embodiment, the apparatus features storage capability wherein the primary component is contained in a first storage vessel and the secondary component is contained in a second storage vessel; and wherein optionally, the first and second storage vessel may be collocated with the power module. Further embodiments include use of a single storage vessel equipped with one or more internal bladders or baffles capable of storing one or more of the liquid compositions as disclosed herein, to enable selective storage, pumping and mixing.

A further embodiment contemplates an apparatus including a carbon sensing detector collocated with at least one exhaust stream from the combustion chamber capable of monitoring the level of carbon released in the exhaust stream; wherein the carbon sensing detector serves to control the metering pump to provide a corresponding amount of carbon-neutral sourced carbon to the primary LOHC feed to at least match the amount of carbon being exhausted to the atmosphere from the power module.

Target Blend Fraction

For maintaining carbon-neutral operation, the relative amount of unloaded aromatic substrate that is available for combustion is less than or equal to the relative amount of carbon-neutral secondary component in the recyclable LOHC blend. Accordingly, a target blend fraction is defined as the weight fraction of carbon-neutral secondary component that is present in the recyclable LOHC. The target blend fraction may be in a range from 0.1-25 wt %, while in another embodiment from 0.1-10 wt % and yet in another embodiment from 1-10 wt %. The target blend fraction may be established in one of several ways. For example, the target blend fraction may be an industry-wide standard for all LOHC blends. Alternatively, the target blend fraction may be a characteristic property of fuels designated by vehicle type, with fuels specifically tailored for one or more of cars, trucks, maritime vessels, buses, trains, and aircraft. Alternatively, the recyclable LOHC may be formulated with a target blend fraction of carbon-neutral LOHC for a specific vehicle or even a specific journey, using a blending or service facility that supplies fuel to the vehicle.

It will be apparent that the target blend fraction specification may vary from vehicle to vehicle, and from journey to journey. Accordingly, the recyclable LOHC blend composition may be selected for a particular journey or for a particular vehicle. In another embodiment, the target blend fraction of the recyclable LOHC blend may be determined as a regional or a corporate-wide average. An objective for establishing a target blend fraction of carbon-neutral fuel components in the recyclable LOHC blend is to significantly reduce or eliminate the $CO_2$ emissions from hybrid hydrogen-electric vehicles. Establishing the target blend fraction allows the industry to specify an amount of carbon-neutral fuel components for carbon-neutral vehicle operation while meeting supply and price limitations.

The recyclable LOHC is suitable for use as a source of hydrogen for a vehicle having transmission capability to communicate the particular power module characteristics with service facilities. At least in part, the communication includes information to establish the target blend fraction requirement of the recyclable LOHC blend for the particular module, based on specific characteristics of the dehydrogenation reaction zone and other thermal needs of the module. The service facility providing the recyclable LOHC then blends an amount of hydrogenated carbon-neutral component into the majority hydrogenated recycle component to form a tailored fuel specific for the needs of the particular module, to ensure carbon-neutral operation of the module.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

We claim:

1. A method for generating hydrogen from a blended liquid organic hydrogen carrier (LOHC) feed in an electricity generating power module, comprising:
   a. supplying said blended LOHC feed to said electricity generating power module, said blended feed comprising a primary component and an added amount of a secondary component;
   b. wherein said secondary component comprises carbon that is sourced from a carbon-neutral source;
   c. supplying said blended LOHC feed to a dehydrogenation reactor within said power module, and generating hydrogen therefrom;
   d. electrochemically converting at least a portion of the generated hydrogen in a fuel cell unit to electricity and emitting a carbon-containing gaseous exhaust stream into the atmosphere from said power module;
   e. wherein the amount of secondary component that is blended into the blended LOHC feed provides a corresponding amount of carbon-neutral sourced carbon to at least match the amount of carbon being exhausted to the atmosphere from said power module.

2. The method according to claim 1, wherein the primary component of said blended LOHC feed is an at least partially hydrogenated primary liquid organic compound having a cyclic chemical structure and containing greater than 5 wt % labile hydrogen; wherein, optionally, said primary component is stored in a first storage vessel in the power module.

3. The method according to claim 2, wherein the secondary component of said blended LOHC feed is an at least partially hydrogenated secondary liquid organic compound having a cyclic chemical structure and containing greater than 5 wt % labile hydrogen; wherein said secondary component comprises carbon that is sourced from a carbon-neutral source, wherein, optionally, said secondary component is stored in a second storage vessel in the power module.

4. The method according to claim 3, wherein said blended LOHC consists of a primary component feed originating from said first storage vessel and a predetermined amount of a secondary component feed originating from said second storage vessel; wherein said fuel cell unit electrochemically converts at least a portion of the generated hydrogen to electricity while emitting a carbon-containing gaseous exhaust stream into the atmosphere from said power module; wherein the amount of added secondary component present in the blended LOHC provides sufficient carbon content to at least match the predetermined amount of carbon to be exhausted to the atmosphere from the operating power module.

5. The method according to claim 3, wherein said blended LOHC consists of a primary component feed with a metered amount of said secondary LOHC component; wherein said blended LOHC feed originates from said first storage vessel; further comprising the steps of:
  a. determining the amount of carbon content of the carbon-containing gaseous exhaust stream emitted from said fuel cell; and
  b. adding a metered amount of said secondary component feed into said primary component feed; wherein said metered amount of said secondary component provides sufficient carbon to at least match the determined amount of carbon being emitted in said gaseous exhaust stream during the conversion of said blended LOHC feed to electricity.

6. The method according to claim 3, wherein said blended LOHC feed is selected from a monocyclic molecule, a homocyclic molecule, a polycyclic molecule and a heterocyclic molecule, and combinations thereof.

7. The method according to claim 6, wherein said blended LOHC feed contains at least one liquid organic compound selected from cyclohexane, methyl cyclohexane, dimethyl cyclohexane, trimethyl cyclohexane, benzyl-methyl cyclohexane, decalin, 1-methyl indole, 1,2-dimethyl indole, dibenzyl toluene, and all partially dehydrogenated isomers thereof, and combinations thereof; and wherein said blended LOHC feed contains at least 5 wt % labile hydrogen.

8. The method according to claim 1, wherein said blended LOHC feed contains between 0.1-25 wt % of said secondary component.

* * * * *